Patented Dec. 12, 1950

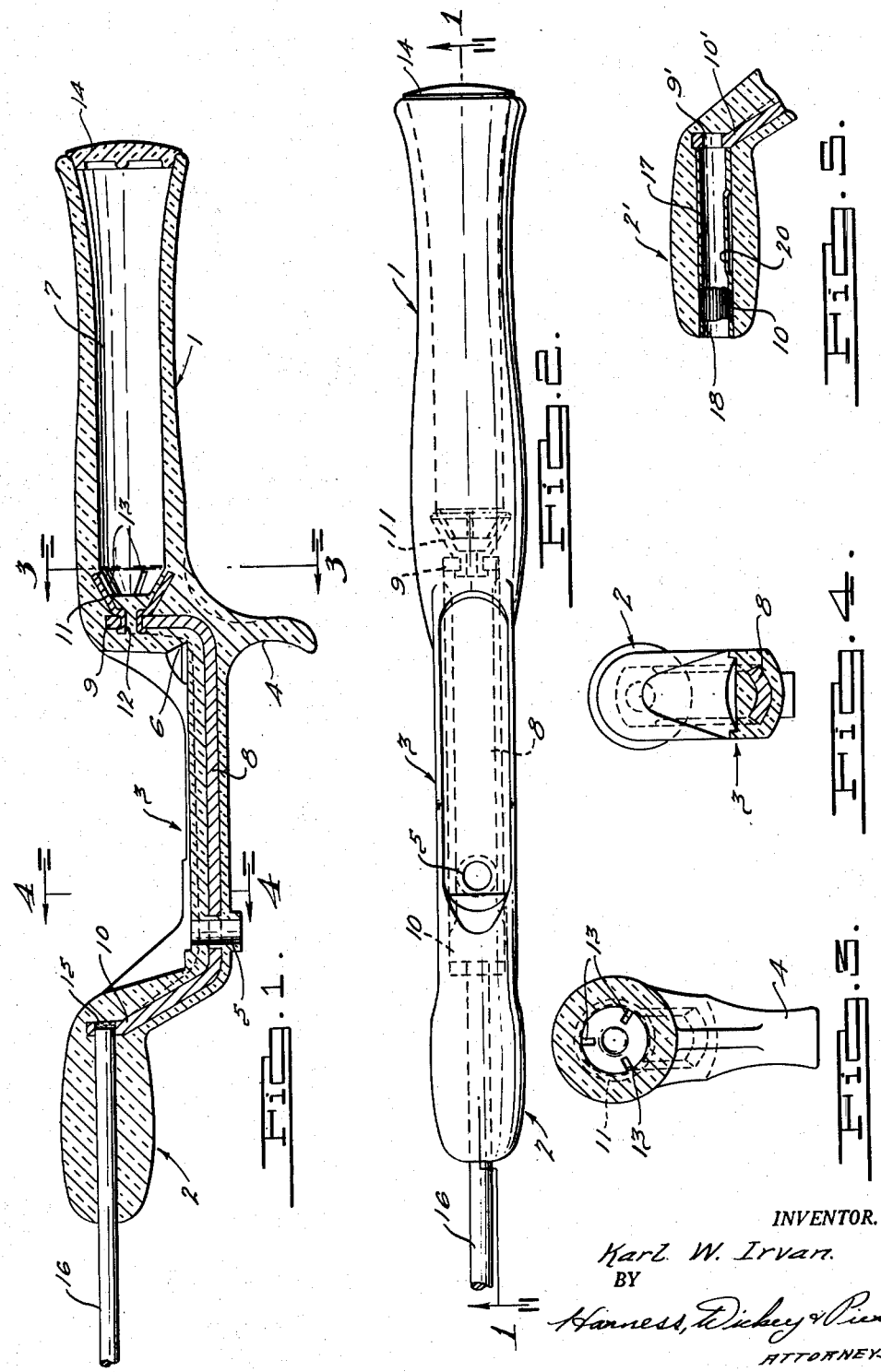

2,534,027

UNITED STATES PATENT OFFICE 2,534,027

FISHING ROD HANDLE

Karl W. Irvan, Detroit, Mich., assignor to Orchard Industries, Inc., Detroit, Mich., a corporation of Michigan Application January 14, 1949, Serial No. 70,863

2 Claims. (Cl. 43—23)

The present invention relates to an improved handle for a fishing rod of the type known as a casting rod.

It is a general object of the invention to provide a handle of more or less conventional exterior form which is inexpensive to manufacture, attractive in appearance, light in weight, and of adequate strength.

A further object of the invention is to provide a handle of the type mentioned which is molded from a suitable plastic material in a unitary structure and which contains a reinforcing metal core for those portions in which the greatest stresses are concentrated.

A further object of the invention is to provide a reinforcing core construction for a unitary plastic molded handle of the type mentioned which will facilitate the molding operation and which, because of its novel construction, can be centered or properly located within the mold during the plastic molding operation in a simple and effective manner.

A further object of the invention is to provide a handle of the type mentioned to which is integrally secured the fishing rod, itself, and in which the rod assists in the locating or centralizing of the reinforcing insert during the molding operation.

Other objects and advantages of the invention will become apparent from the following specification, the accompanying drawings and the appended claims.

In the drawings:

Figure 1 is a longitudinal section through the handle taken on the line 1—1 of Figure 2, showing an integrally attached rod;

Figure 2 is a plan view of the handle and rod;

Figure 3 is a section taken on the line 3—3 of Figure 1;

Figure 4 is a section taken on the line 4—4 of Figure 1; and

Figure 5 is a fragmentary longitudinal sectional view of a forward end of a modified form of handle construction adapted for use in connection with a removable fishing rod.

As best shown in Figure 1, the handle comprises a unitary molded structure including a rear grip portion 1, a forward grip portion 2 and a reel seat portion 3 of more or less conventional external form. The unitary structure also includes a downwardly projecting finger grip 4 located at the rearward end of the reel seat portion. The forward portion of the reel seat 3 is provided with an opening 5 adapted to receive a screw which will thread into a conventional reel clamp plate, not shown. As is well known, the reel clamp clamps the forward end of the base of a fishing reel to the reel seat while the rearward end of the base of the reel is held against the reel seat by a notch 6 formed therein. Inasmuch as the notch 6 is undercut, it is preferred to form the notch by a machining operation after the handle is completely molded, thus simplifying the form and construction of the molding dies required. If desired, however, the notch 6 may be formed during the molding operation.

In order to reduce the weight of the handle to a minimum and also the amount of plastic material required, the rear grip portion 1 is formed as a hollow tubular member having an internal cavity 7 which may be formed during the molding operation by a removable corepiece.

The reel seat portion of the handle and the points of connection of the reel seat to the rear and front grips 1 and 2 are reinforced by a single U-shaped metal stamping having a base portion 8, a rearward upstanding leg 9 and a forward upstanding leg 10. As best shown in Figure 4, the reel seat portion 8 is bent into a shallow V-shaped form in cross section for stiffening purposes, and this V-shaped form continues upwardly on the leg portions but becomes progressively flatter or shallower until, adjacent the upper ends of the legs 9 and 10, the insert is perfectly flat.

In order to reinforce the point of connection of the rear grip 1 to the reinforcing insert leg 9 and assist in locating the insert during the molding operation, there is provided a conical cup-shaped stamping 11 having a forwardly extending tubular extension 12 at its base which projects through a suitable opening in the leg 9 of the reinforcing insert and is riveted over to retain the cup-shaped stamping in fixed position with respect to the remainder of the insert.

The cup-shaped member 11 and the removable core utilized to form the hollow cavity 7 in the rear grip 1 are so constructed that the core will engage the interior surface of the cup-shaped stamping 11 and thus positively locate the stamping and the rear end of the associated insert in fixed relation with respect to the die or mold cavity. For that purpose, it is preferred that the plastic material partially cover and embed the cup-shaped member 11. Therefore, the forward end of the core is provided with a conical surface upon which is formed a plurality of circumferentially spaced longitudinally extending ribs or splines which engage the inner surface of the cup 11 at circumferentially spaced points. As a result, the plastic material which covers the major portion of the internal surface of the cup 11 will have a plurality of slots 13 left by the ribs of the corepiece.

As a result of this arrangement, the cup-shaped member is adapted to perform a locating function during the molding operation and yet be substantially embedded within the plastic. The layer of plastic material covering the major portion of the inner side of the cup-shaped member functions to resist separation of the outer side of the member from the molded plastic under the stresses applied to the base of the handle during use of the fishing rod.

The rear or open end of the rear grip 1 may be closed in the completed handle by a separate cap 14 secured in place by a suitable cement.

The forward leg 10 of the reinforcing insert is provided with an opening 15 aligned with the axis of the fishing rod. In the preferred form of construction illustrated in Figure 1, the rear end of the fishing rod, indicated by the numeral 16, is inserted within the opening 15 and welded in place in order to permanently secure the rod to the insert. The rod then serves to locate and centralize the forward end of the insert in the molding die during the molding operation. The result is an exceedingly simple and accurate method of locating an entirely embedded reinforcing insert within a unitary molded article without the use of complicated die mechanisms. The die may simply be a two-part die split on a parting line in an irregular plane normal to the paper in Figure 1. It is only necessary that the die members have provision for holding the rod 16 and the core insert for the rear grip in proper axial position.

The preferred form of invention illustrated in Figures 1 to 4 is peculiarly suited to the production of a low cost permanently connected fishing rod and handle. However, at a slight increase in cost the principles of the invention may be applied to a fishing rod handle which is removable from the rod for carrying and storage purposes. Thus, as shown in Figure 5, the forward leg of the reinforcing insert 10' is provided with an opening 9' similar to the corresponding parts in Figure 1 but the fishing rod is not secured within the opening 9' prior to the molding operation. On the contrary, a removable cylindrical core is utilized which will provide a cylindrical opening 17 in the front grip 2' and the forward end of the corepiece has a reduced extension adapted to fit within the opening 9' for locating the forward end of the insert. After the complete molded handle is removed from the die, a sheet metal tubular member 18 is press-fitted within the cylindrical recess 17. The tubular member 18, if desired, may be provided with knurling, as indicated at 19, to assist in holding it in place within the recess. The tubular member is preferably formed of thin sheet brass or spring bronze and is of uniform diameter throughout its length. However, intermediate its ends the wall of the tubular member is permanently displaced inwardly at one point around its periphery, thus forming a region, indicated by the numeral 20, which is spaced slightly from the walls of the cylindrical recess 17. As a result of this construction, a fishing rod having a cylindrical butt end of a diameter very slightly less than the internal diameter of the tubular member 18 may be inserted within the member and yieldingly held in position by the resilience of the inwardly deflected portion 20. This provides an inexpensive socket which will satisfactorily hold a fishing rod in place but which will avoid binding and freezing, such as are commonly encountered with conventional tapered sockets.

It will be apparent that variations in the details of construction may be indulged in without departing from the spirit of the invention or the scope of the appended claims.

What is claimed is:

1. A fishing rod handle having a front grip, a hollow tubular rear grip and an intermediate offset reel seat portion, said handle being formed as a unitary molded element of plastic material, said reel seat portion having a metal reinforcing core element embedded therein and provided with upwardly extending legs projecting from points adjacent the ends of the reel seat portion to points adjacent the inner ends of said grip portions, and a rearwardly facing cup-shaped member fixed with respect to the end of the rear leg of said element and communicating at its inner surface with the interior space within the rear grip.

2. A fishing rod provided with a handle having a front grip, a hollow tubular rear grip and an intermediate offset reel seat portion, said handle being formed as a unitary molded element of plastic material, said reel seat portion having a metal reinforcing core element embedded therein, said fishing rod having its butt end permanently fixed to said core element and embedded within said front grip, said element being provided with upwardly extending legs projecting from points adjacent the ends of the reel seat portion to points adjacent the inner ends of said grip portions, and a rearwardly facing cup-shaped member fixed with respect to the end of the rear leg of said element and communicating at its inner surface with the interior space within the rear grip.

KARL W. IRVAN.

REFERENCES CITED

The following references are of record in the file of this patent:

UNITED STATES PATENTS

| Number | Name | Date |
|---|---|---|
| 2,127,163 | Davis | Aug. 16, 1938 |
| 2,158,728 | Peters | May 16, 1939 |
| 2,206,019 | Benson | July 2, 1940 |
| 2,252,054 | Welch | Aug. 12, 1941 |
| 2,281,457 | Stowell et al. | June 23, 1942 |

FOREIGN PATENTS

| Number | Country | Date |
|---|---|---|
| 465,270 | Great Britain | May 3, 1937 |